March 3, 1959  A. E. SCHWANEKE ET AL  2,876,317
COMPENSATED SPEED GOVERNOR
Filed Jan. 7, 1957  2 Sheets-Sheet 1
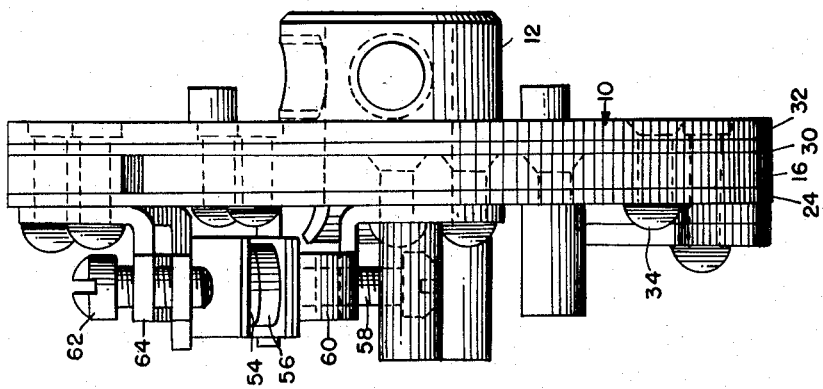
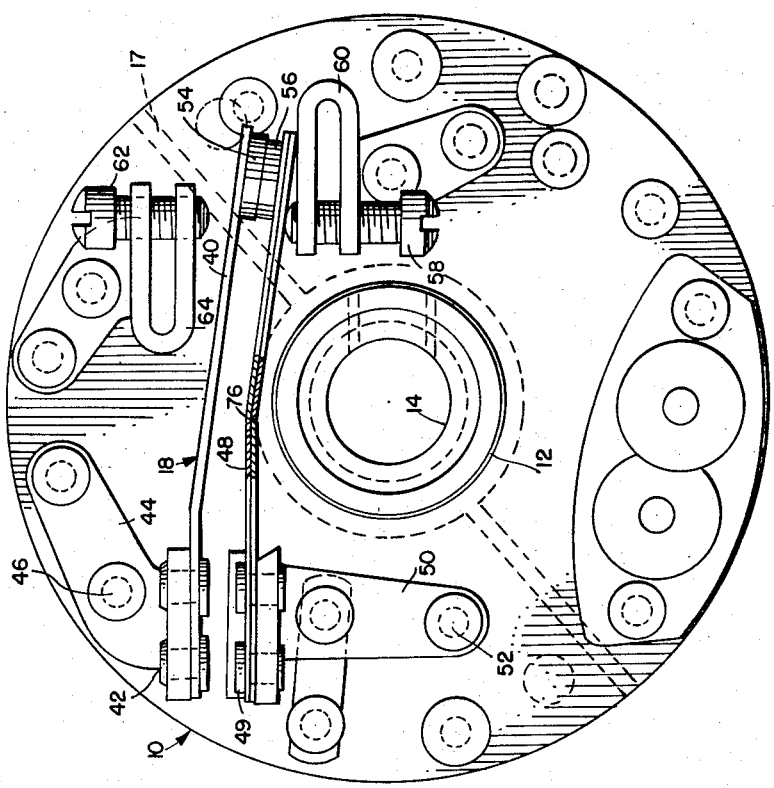
INVENTORS:
HERMAN P. RANDICK
ALFRED E. SCHWANEKE
BY
ATT'Y March 3, 1959 A. E. SCHWANEKE ET AL 2,876,317
COMPENSATED SPEED GOVERNOR
Filed Jan. 7, 1957 2 Sheets-Sheet 2
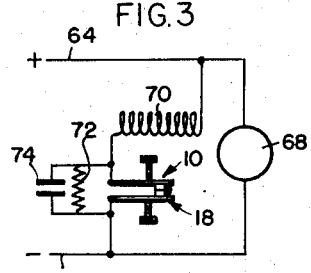
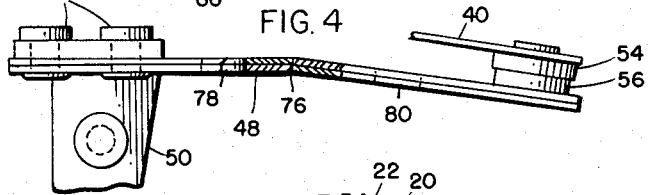
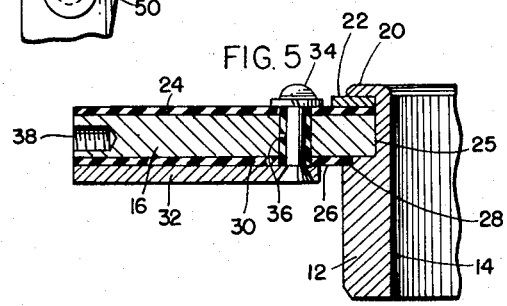
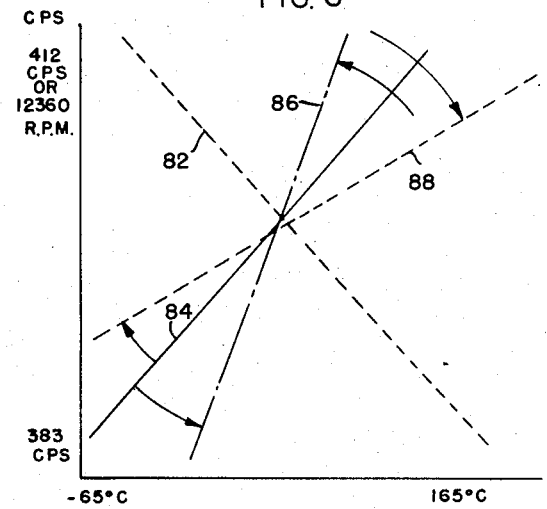
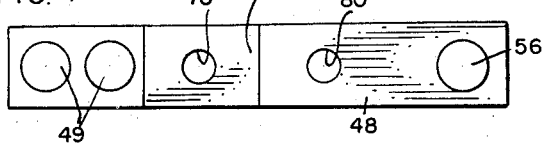
INVENTORS:
HERMAN P. RANDICK
ALFRED E. SCHWANEKE
BY
ATT'Y United States Patent Office 2,876,317
Patented Mar. 3, 1959

2,876,317

COMPENSATED SPEED GOVERNOR

Alfred E. Schwaneke, Northbrook, and Herman P. Randick, Chicago, Ill., assignors to A-M Company, Chicago, Ill., a partnership Application January 7, 1957, Serial No. 632,760

6 Claims. (Cl. 200—80)

This invention relates to a compensated speed governor and more particularly to a compensated speed governor for prime movers, such as an electric motor, and generators or the like wherein the effect of changes in temperature upon the drive unit and upon the work output of a driven unit are compensated for automatically.

Heretofore, it has been virtually impossible to accurately control an electric prime mover of the type described as temperature changes, particularly throughout a range of −65° to +165° F., because of composite variables occurring with temperature changes in both the drive and driven units and because of the different work requirements expected at different temperatures. Consequently, the use of a single mechanical arrangement operative to achieve control having any real degree of accuracy has been almost completely discounted.

Accordingly, it is an object of the present invention to provide a single compensated speed governor compounded to have the requisite response and control characteristics to provide various operating speeds for electric motors and the like throughout an extended range of temperatures which may be encountered.

Another object of the invention is to provide a governor as described which may be tested and adjusted to achieve accurate calibration thereof within given temperature ranges, either for constant output or a changed output in accordance with a predetermined pattern of speed or frequency of the output of the apparatus controlled thereby.

Another object of the invention is to provide an improved compensated speed governor wherein the increment of centrifugal force produced by speeds slightly in excess of the desired speed is effective to operate a bimetal control element mounted eccentrically on the governor to produce slowing of the motor; conversely, a corresponding object is to provide a compound bi-metal control as described which will also operate and maintain a constant speed when speed tends to fall below a predetermined level regardless of temperature changes, yet which is adjustable to provide different operating speeds if desired.

Another object of the invention is to provide a speed governor of the type indicated wherein the bi-metal control switch is responsive to changes in temperature in the motor and surrounding environment to compensate for or vary speed control effects otherwise produced thereby.

Another object of the invention is to provide a resistance in the field circuit for the governor which is shorted to give the motor a high load starting characteristic and is maintained in such condition until a predetermined speed of rotation is passed, whereupon shunting of the circuit through the said resistance is effected to give the motor a decreasing speed characteristic, and thereafter the bi-metal contacts of the control governor open and close in response to centrifugal force acting thereon to produce slowing and increasing the motor operating speed characteristic by varying the field strength and thereby maintain a predetermined operating speed.

Other objects and advantages of the invention will become apparent as the description proceeds in accordance with the drawings, in which:

Fig. 1 is a plan view of the compensated speed governor of the invention;

Fig. 2 is a side elevational view of the device of Fig. 1;

Fig. 3 is a diagrammatic representation of a circuit for the compensated speed governor of the invention;

Fig. 4 is an enlarged fragmentary view of the bimetal control for the governor shown in Figs. 1 and 2;

Fig. 5 is a fragmentary vertical sectional view of the hub and plate joint for the governor;

Fig. 6 is a chart showing the mode of adjustment of the governor with respect to variations in temperature and speed of operation; and Fig. 7 is a top plan view of a reverse welded bi-metal blade for use in the governor of the invention.

Referring now to Figs. 1, 2, 4 and 5, the governor of the invention includes a wheel 10 comprising a hub portion 12 defining an axial bore 14 for mounting the governor upon a D. C. generator motor or the like and a wheel plate or circular disc 16 of a split ring type, as shown at 17, carrying a bi-metal control element 18. The disc 16, preferably of stainless steel or a similar material, is firmly secured upon the hub or sleeve 12, also preferably of stainless steel, by swaging the relatively thin upper end 20 of the sleeve outwardly to engage a metal washer 22 disposed in abutting relationship against a fibrous or insulating surface member 24; and the opposite face of the disc 16 is secured in position by a predetermined stepped configuration in the hub 12. This stepped configuration includes recessed portion 25 which may be narrowed if desired to engage the inner boundary of the disc snugly against the reduced area of the sleeve 12, a step 26 in the sleeve or hub and a recessed shoulder portion 28 adapted to receive an insulating layer 30 corresponding to a layer 24 so that the layer 30 is held tightly in position to provide an electrical shield. These elements, as well as a backing plate 32, are secured in position by a plurality of rivets such as the rivet 34, which is desirably surrounded by an insulating sleeve 36.

In order that the disc 16 may be properly balanced and adjusted, a plurality of radially disposed apertures 38 are defined peripherally thereof at predetermined spaced intervals. As seen in Fig. 1, the upper hemispherical portion of the disc 16 is relatively heavily weighted by the bi-metallic control 18; and therefore the recesses or apertures 38 are formed in this portion of the disc.

The bi-metallic control 18 is disposed radially outwardly of the center of disc 16 a predetermined distance (i. e., eccentrically thereon) and comprises a relatively stiff stainless steel blade 40 mounted by rivets 42 upon a bracket 44 held by bolts or rivets 46 upon the disc 16, and bi-metallic blade 48 having two edges abutting end portions welded together at 76 and each comprising one metal layer of relatively high heat-expansion coefficient and another metal layer of relatively low heat coefficient. The relative portions of the respective layers of metal are reversed (i. e., inverted from top to bottom) with respect to each portion on opposite sides of their juncture to provide a compound or reverse welded bi-metal stick, whose portions flex in opposite directions under temperature changes. The compound bi-metal is mounted substantially parallel to blade 40 by means of rivets 49 upon a bracket 50 corresponding to the bracket 44 and similarly secured to the disc 16 by means of rivets such as the rivet 52. Each of the blades 40 and 48 is disposed substantially along a chord of the disc 16 and carries at its outer extremity a contact, designated by reference numerals 54 and 56, respectively. The blade 48 is normally disposed in contact and closed relationship to the blade 40 as determined by means of a threaded bolt 58 secured in a U-shaped bracket 60 secured to the disc 16; and a corresponding adjustment bolt 62 mounted on a bracket 64 is disposed opposite the bolt 58 for limiting radial outward movement of blade 40 as hereinafter set forth.

Referring now to Fig. 3, an exemplary circuit is shown in diagrammatic form for the governor 10 of the invention comprising a pair of positive and negative leads 64 and 66 having connected thereacross the armature 68 of the motor. The governor 10 is adapted to be actuated by the motor by securing the governor hub 12 to the motor shaft (not shown), and the governor contacts are in series with a field winding 70 of the motor and are in parallel with a resistance 72 shunted by a condenser 74. Although a shunt wound motor is shown in Fig. 3, it will be understood that a series wound motor may be employed. It will also be appreciated that either A. C. or D. C. equipment may be used therewith.

When current is first passed through the circuit to energize the motor, the blades 40 and 48 are in contact and remains so with the motor running at slow speed, whereby maximum current flows through the coil 70. Thereafter, at speeds which may be, for example, in the range of 5,000 to 8,000 R. P. M., centrifugal force causes blade 40 to break away and move up against bolt 62. Since the field current is then shunted through the resistance 72, the magnitude of a current flow diminishes thereby causing the motor speed to increase to an upper limit of 15,000 R. P. M. for example. This higher speed and more particularly the greater centrifugal force effected thereby moves the blade 48 into contact with blade 40, again to short resistance 72 so that the field current increases to reduce motor speed.

When the motor and governor 10 rotated thereby have been slowed sufficiently, for example, to a rate of 12,000 R. P. M., the bi-metallic element 48 falls back and remains in break-away position as a result of the lower centrifugal force until the shunt circuit through the resistance 72 once again creates a condition of slightly excessive speed, as described. This controlling action takes place rapidly to accurately maintain the desired speed.

As is known in the art, the bi-metallic construction of the blade 48 compensates the response thereof in accordance with temperature changes to yield a relatively stable motor speed irrespective of temperature change. Rough calibration of this compensating action may be accomplished to some extent by changing the location of the welded juncture 76 in element 48 so that with temperature changes the centrifugal force necessary to deflect the bi-metallic element is substantially as desired. However, with wide variations in the operating conditions, it is desirable to have calibration of the device which is more complete than is afforded by the positioning of the juncture point, or even the setting of the initial speed and the kickover point by the adjustment bolts 58 and 62, respectively. And thorough calibration is desirable in any case for accurate operation of the device.

This complete calibration is achieved by means of a pair of apertures 78 and 80 disposed on either side of the juncture point 76, whose individual diameters may be varied to alter the temperature-responsive characteristics of the bi-metal control.

The graph illustrated in Figure 6 of the drawings depicts a plurality of curves in which the rotational velocity of a motor is plotted against changes in the operating temperature thereof. Curve 82 is representative of the change in operating speed that occurs with an increase in temperature when an uncompensated governor (that is, one not embodying the present invention) is employed to control the motor speed. It is apparent that the speed decreases in a substantially linear relation with respect to increases in the operating temperature. The reason for this is that the deflectable blades of a governor experience a change in the modulus of elasticity thereof with changes in temperature to the extent that the blades are more readily deflectable when the temperature increases, and vice versa. Therefore, the blades are deflected outwardly by a smaller centrifugal force as temperature increases, with the result that the resistance 72 is effectively shorted out of the field circuit at a lower motor speed, the field current is thereby increased, and the motor speed necessarily diminishes.

The curve 84 which is substantially a straight line, indicates the desired governor response—namely, a progressive increase in the operating speed of the motor as temperature increases in a linear relation therewith. A changing relationship of this type may be required in numerous environments as, for example, to overcome or compensate for an effective load that increases with temperature such as results from an increase in friction which in many cases is caused by a temperature rise. This condition may be attained by means of the apertures 78 and 80 formed in the deflectable blade 48. The aperture 78, which is located to the left of the juncture 76 as viewed in Figure 4, decreases the magnitude of the speed change as temperature increases.

Thus, if the size or diameter of the aperture 78 is increased, the speed-temperature curve will move to or beyond the curve 88. On the other hand, as the size or diameter of the aperture 80 is increased, the rate of change of motor speed increases with changes in the temperature, as indicated by the curve 86. It will be apparent then that the apertures 78 and 80 may be dimensioned so that the rate of change of the motor speed with changes in the operating temperature extend along the curve 84, or can be made to deviate therefrom in the direction and to the extent desired for particular adaptations or uses of the invention.

If a decrease in temperature will cause a corresponding increase in speed of the device, or an increase in temperature results in a proportional decrease in speed, these effects may be overcome by varying the size or diameter of apertures 78 in accordance with the rule that an increase in size of aperture 78 (nearest the mountings 42 and 49) will decrease the change in speed from a given change of temperature, which aperture 80 will counterbalance this effect by affording an increase in change of speed in response to a given temperature differential. These factors may be read for a specific case in Fig. 6, as stated, with the bi-metal so oriented that the portion 48 thereof bends with an increase in temperature to carry the juncture point radially inwardly.

Accordingly, a speed governor has been provided which introduces a correction effect in which the weight of the blade 48 and its contact is effective to close the switch 18 when the centrifugal force resulting from the radially outward position of the switch is sufficiently great. The characteristics of operation of the correction may be varied by varying the outward disposition of the juncture point 76 and its bi-metal blade 48 from the center of the disc 18. The heat-responsive element 48 and the compensating apertures on either side of the flexure point of this element assure uniform operation throughout a very great range of temperatures and speeds, as shown, without noticeable dependence upon the axial spacing of these elements from the point 76. However, variation in the longitudinal position of the flexure point is a further adjustment feature, to afford still greater flexibility and accuracy of operation and control. Further, the disc itself may be exceptionally well-balanced, as described.

Although we have herein set forth and described our invention with respect to certain details and principles thereof, it will be obvious to those skilled in the art that these may be varied in accordance with the scope and spirit of the invention as set forth in the hereunto appended claims.

We claim:

1. In a governor structure of the character described, a disc adapted to be rotated, and a centrifugal switch carried by said disc and being adapted to be connected in an electric circuit to control the same as the switch is opened and closed by changes in the value of centrifugal force acting thereon, said switch comprising a bimetallic blade deflectable in response to centrifugal force in excess of a predetermined value acting thereon and being characterized by self-adjustment thereof to compensate for changes in temperature which would otherwise unpredictably alter the deflection response thereof, said bimetallic blade having at least one aperture formed therein and oriented along its length to alter the compensation characteristics thereof.

2. The governor structure of claim 1 in which said blade is provided with a second aperture therein, said apertures being spaced apart along the longitudinal axis of the blade and being disposed on opposite sides of the center thereof.

3. The governor structure of claim 2 in which said blade comprises two bimetallic sections, one inverted with respect to the other and rigidly joined at the mid-portion of the blade, said apertures being disposed on opposite sides of the rigid juncture.

4. In a governor structure for use in controlling the rotational velocity of electric motors and the like, a disc adapted to be mounted on the shaft of such motor so as to be rotated thereby, and a centrifugally actuated switch carried by said disc for connection in the circuit of such motor to regulatively alter the current flow characteristics thereof in response to changes in the condition of the switch as reflected by changes in the rotational velocity of such motor, said switch comprising a contact-equipped deflectable blade extending chordially of the disc and a contact-equipped bimetallic blade also extending chordially of said disc in substantially parallel relation with said first mentioned blade and also being deflectable in response to centrifugal force in excess of a predetermined magnitude acting thereon, said bimetallic blade having a plurality of apertures extending transversely therethrough in spaced relation along the longitudinal axis thereof, the size and disposition of said apertures being effective to alter the temperature compensating characteristics of the blade resulting from the bimetallic construction thereof.

5. The governor structure of claim 4 in which said bimetallic blade comprises a pair of bimetallic sections, one inverted with respect to the other and rigidly joined thereto, at least one of said apertures being oriented on one side of such rigid juncture and another aperture on the other side thereof.

6. The governor structure of claim 5 in which a first adjustable stop is carried by said disc for engagment by said first mentioned deflectible blade to limit the deflection response thereof, and in which a second adjustable stop is also carried by said disc for engagement with said bimetallic blade to determine the position thereof when said disc is at rest.

References Cited in the file of this patent
UNITED STATES PATENTS

| | | |
|---|---|---|
| 1,632,565 | Schmidt | June 14, 1927 |
| 2,736,855 | Howard | Feb. 28, 1956 |
| 2,767,272 | Nader | Oct. 16, 1956 |